United States Patent
Collins et al.

(10) Patent No.: US 9,587,496 B2
(45) Date of Patent: Mar. 7, 2017

(54) TURBINE BLADE MID-SPAN SHROUD

(71) Applicant: General Electric Company, Schenectady, NY (US)

(72) Inventors: Daryl R. Collins, Simpsonville, SC (US); David Arthur Butz, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 406 days.

(21) Appl. No.: 14/453,932

(22) Filed: Aug. 7, 2014

(65) Prior Publication Data

US 2016/0040536 A1 Feb. 11, 2016

(51) Int. Cl.
*F01D 5/22* (2006.01)
*F01D 5/14* (2006.01)

(52) U.S. Cl.
CPC ............... *F01D 5/22* (2013.01); *F01D 5/225* (2013.01); *F01D 5/147* (2013.01); *Y02T 50/673* (2013.01)

(58) Field of Classification Search
CPC ............. F01D 5/22; F01D 5/225; F01D 5/147
See application file for complete search history.

(56) References Cited

U.S. PATENT DOCUMENTS

| | | | |
|---|---|---|---|
| 6,814,543 B2 | 11/2004 | Barb et al. | |
| 8,182,228 B2 | 5/2012 | Riley et al. | |
| 8,523,525 B2 | 9/2013 | Marra | |
| 8,684,692 B2 * | 4/2014 | Mayer | F01D 5/187 415/115 |
| 8,790,082 B2 * | 7/2014 | Merrill | F01D 5/147 416/96 R |

OTHER PUBLICATIONS

Co-pending U.S. Appl. No. 14/453,924 dated Aug. 7, 2014.
Co-pending U.S. Appl. No. 14/453,914 dated Aug. 7, 2014.

* cited by examiner

*Primary Examiner* — John K Fristoe, Jr.
*Assistant Examiner* — Hoon Choi
(74) *Attorney, Agent, or Firm* — Dority & Manning, PA (57) ABSTRACT

A mid-span shroud assembly comprises a suction side shroud body which defines a first spar. The first spar is formed to extend at least partially through a spar opening defined within the airfoil and includes a root portion, a tip portion, an upper face and a lower face. The upper and lower faces converge from the tip portion towards the root portion. The mid-span assembly further includes a pressure side shroud body. The pressure side shroud body defines a second spar which is formed to extend at least partially through the spar opening of the airfoil and includes a root portion, a tip portion, an upper face and a lower face. At least a portion of the upper face of the second spar is formed to be substantially parallel with the lower face of the first spar when both the first and second spars are inserted into the spar opening.

20 Claims, 4 Drawing Sheets

TURBINE BLADE MID-SPAN SHROUD

FIELD OF THE INVENTION

The present invention generally relates to a turbine blade. More particularly, this invention involves a mid-span shroud assembly for the turbine blade.

BACKGROUND OF THE INVENTION

A rotating turbine blade, also known as a turbine bucket or turbine rotor blade, converts energy from a flowing fluid such as hot combustion gas or steam into mechanical energy by causing a shaft of a turbomachine to rotate. As the turbomachine transitions through various operating modes, the turbine blades are subjected to both mechanical and thermal stresses.

Mechanical stresses, such as fatigue, may be caused by fluctuating forces in combination with steady state forces. More specifically, the turbine blades may experience fluctuating forces when they rotate through non-uniform fluid flow downstream from stationary vanes, also known as nozzles, positioned between adjacent rows of turbine blades. A basic design consideration for turbomachines is to avoid or to minimize resonance with natural frequencies of the turbine blades and the dynamic stresses produced by forced response and/or aero-elastic instability.

For example, each turbine blade on a rotating turbine disc experiences a dynamic force when rotated through the non-uniform flow from stationary vanes. As the turbine blades rotate through areas of non-uniform flow, they may exhibit a dynamic response, such as, for example, stress, displacements, etc. Additionally, a turbine bladed disc may be induced into a state of vibration wherein the energy build up is a maximum. This is exemplified by areas of the blade or disc where the stress or displacement is at a maximum level, and the resistance to the exciting force of the blade or disc is at a minimum. Such a condition is known as a state of resonance.

When analysis or empirical testing indicates that a turbine blade and/or rotor disk may encounter a resonance condition during operation of the turbomachine, steps may be taken to facilitate minimizing the probability of encountering resonance. For example, shroud sets may be formed along the span of each of the turbine blades. Each shroud set generally includes a pair of circumferentially extending shrouds, one shroud projecting from a suction side surface of a turbine blade and one shroud projecting from a pressure side surface of the same turbine blade. Because the shrouds are located intermediate to a blade root portion and a blade tip portion of each turbine blade, they are often referred to as mid-span shrouds. However, mid-span shrouds can be located anywhere along the turbine blade span, not just at the physical mid-point of the span.

Mid-span shrouds are generally effective for avoiding or minimizing resonance with natural frequencies of the turbine blades and/or the dynamic stresses produced by fluctuating forces or "flutter". However, mid-span shrouds are typically cast as part of the turbine blade and may require additional machining or other finishing processes to produce a finished turbine blade. This may only be cost-effective during a design phase of the turbine blade. In addition, a cast in mid-span shroud may not be retrofitted to pre-existing turbine blade designs.

Another method for providing mid-span shrouds to the turbine blade includes press fitting a support member through a bore hole defined in the turbine blade and connecting each shroud to the support member. However, this method may result in undesirable stresses on the turbine blade and/or may result in the support member becoming loose within the bore hole due to differences in thermal expansion between the turbine blade and the press-fit support member during operation of the turbomachine. Therefore, a non-cast or non-integral mid-span shroud assembly which connects to a new or pre-existing turbine blade to alter frequency and mode shape in order to mitigate flutter and/or modify bucket vibratory characteristics would be useful.

BRIEF DESCRIPTION OF THE INVENTION

Aspects and advantages of the invention are set forth below in the following description, or may be obvious from the description, or may be learned through practice of the invention.

One embodiment of the present invention is a mid-span shroud assembly for a turbine blade airfoil. The mid-span shroud assembly comprises a suction side shroud body which defines a first spar. The first is formed to extend at least partially through a spar opening defined within the airfoil. The first spar includes a root portion, a tip portion, an upper face and a lower face. The upper and lower faces converge from the tip portion towards the root portion. The mid-span assembly further includes a pressure side shroud body. The pressure side shroud body defines a second spar which is formed to extend at least partially through the spar opening of the airfoil. The second spar includes a root portion, a tip portion, an upper face and a lower face. At least a portion of the upper face of the second spar is formed to be substantially parallel with the lower face of the first spar. For example, when both the first and second spars are inserted into the spar opening.

Another embodiment of the present invention is a turbine blade. The turbine blade comprises an airfoil having a pressure side wall, a suction side wall opposing the pressure side wall and a spar opening. The spar opening extends through the pressure and suction side walls and defines an upper engagement surface and a lower engagement surface. The turbine blade further includes a mid-span shroud assembly. The mid-span shroud assembly includes a pressure side shroud body which defines a first spar. The first spar is formed to extend at least partially through the spar opening defined within the airfoil. The first spar includes a root portion, a tip portion, an upper face and a lower face. The upper and lower faces converge from the tip portion towards the root portion. The mid-span shroud assembly further includes a suction side shroud body which defines a second spar. The second spar is formed to extend at least partially through the spar opening. The second spar includes a root portion, a tip portion, an upper face and a lower face where the upper face of the second spar is formed to be substantially parallel with the lower face of the first spar. For example, when both the first and second spars are inserted into the spar opening.

Another embodiment of the present invention is a gas turbine. The gas turbine includes a compressor section, a combustion section downstream from the compressor section and a turbine section which is downstream from the combustion section. The turbine section includes a plurality of turbine blades coupled to a rotor shaft. Each turbine blade includes an airfoil having a pressure side wall, a suction side wall and a spar opening. Each turbine blade includes a mid-span shroud assembly which is coupled to the airfoil. The mid-span shroud assembly comprises a suction side shroud body which defines a first spar which is formed to extend at least partially through the spar opening. The first spar includes a root portion, a tip portion, an upper face and a lower face. The upper and lower faces converge from the tip portion towards the root portion. The mid-span shroud assembly further includes a pressure side shroud body which defines a second spar which is formed to extend at least partially through the spar opening. The second spar includes a root portion, a tip portion, an upper face and a lower face. At least a portion of the upper face of the second spar is formed to be substantially parallel with the lower face of the first spar. For example, when both the first and second spars are inserted into the spar opening.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land based gas turbine is shown and described herein, the present invention as shown and described herein is not limited to a land based and/or industrial gas turbine unless otherwise specified in the claims. For example, the invention as described herein may be used in any type of turbomachine including but not limited to a steam turbine, an aircraft gas turbine or marine gas turbine.

Figure 1:
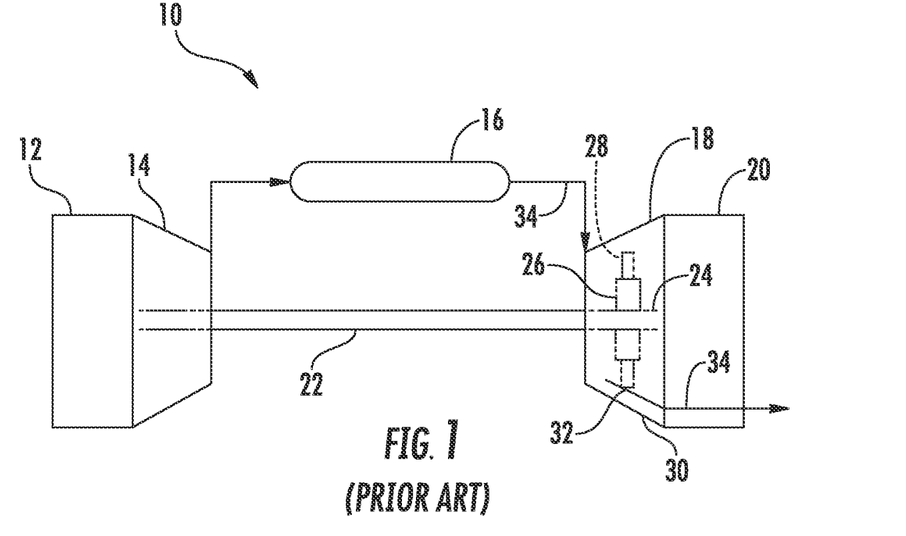
FIG. 1 illustrates a functional diagram of an exemplary gas turbine as may incorporate at least one embodiment of the present invention.

Referring now to the drawings, FIG. 1 illustrates a schematic diagram of an exemplary gas turbine 10 turbomachine as may incorporate various embodiments of the present invention. As illustrated, the gas turbine 10 generally includes an inlet section 12, a compressor section 14 disposed downstream of the inlet section 12, a plurality of combustors (not shown) within a combustor section 16 which is disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The turbine section 18 may generally include a rotor shaft 24 having a plurality of rotor disks 26 (one of which is shown) and a plurality of rotatable turbine blades 28 which extend radially outwardly from and are interconnected to each rotor disk 26. Each rotor disk 26 may, in turn, be coupled to a portion of the rotor shaft 24 that extends through the turbine section 18. The turbine section 18 further includes an outer casing 30 that circumferentially surrounds the rotor shaft 24 and the turbine blades 28, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce hot gases of combustion 34. The hot gases of combustion 34 flow through the hot gas path 32 from the combustor section 16 to the turbine section 18, wherein energy (kinetic and/or thermal) is transferred from the hot gases 34 to the turbine blades 28, thus causing the rotor shaft 24 to rotate. The mechanical rotational energy may then be used to various purposes such as to power the compressor section 14 and/or generate electricity. The hot gases of combustion 34 exiting the turbine section 18 may be exhausted from the gas turbine 10 via the exhaust section 20.

Figure 2:
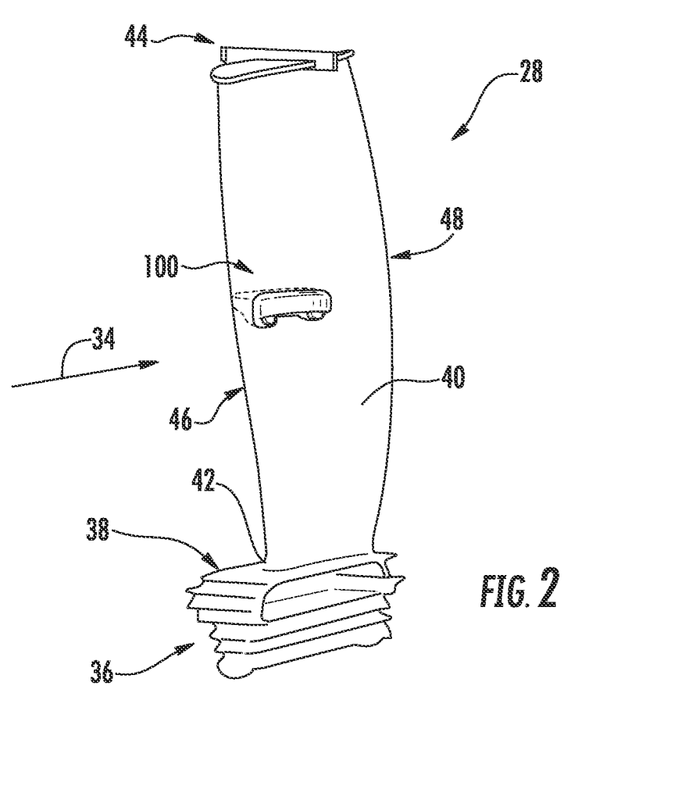
FIG. 2 is a perspective view of an exemplary turbine blade according to at least one embodiment of the present invention.

FIG. 2 is a perspective view of an exemplary turbine blade 28 according to at least one embodiment of the present invention. As shown in FIG. 2, the turbine blade 28 generally includes a mounting portion 36, a platform portion 38 and an airfoil 40 that extends substantially radially outwardly from the platform portion 38. The platform portion 38 generally serves as a radially inward boundary for the hot gases of combustion 34 flowing through the hot gas path 32 of the turbine section 18 (FIG. 1). As shown in FIG. 2, the mounting portion 36 may extend substantially radially inwardly from the platform portion 38 and may include a root structure, such as a dovetail, formed to interconnect or secure the rotor blade 28 to the rotor disk 26 (FIG. 1). As illustrated in FIG. 2, the airfoil 40 extends substantially radially outwardly from the platform 38 in span from a root 42 of the airfoil 40 which may be defined at an intersection between the airfoil 40 and the platform 38, and a tip portion 44 of the airfoil 40. The tip portion 44 is disposed radially opposite the root 42. As such, the tip 44 may generally define the radially outermost portion of the rotor blade 28.

Figure 3:
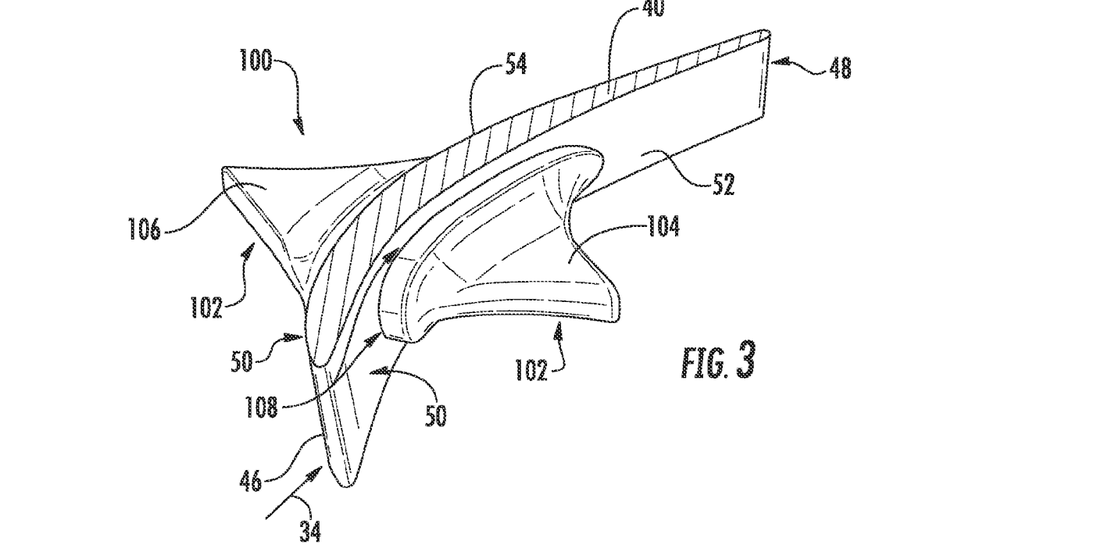
FIG. 3 is a perspective view of a portion of an exemplary turbine blade according to at least one embodiment of the present invention.

FIG. 3 provides a perspective view of a portion of the turbine blade 28 including a portion of the airfoil 40, according to at least one embodiment of the present invention. As shown in FIGS. 2 and 3, the airfoil 40 further includes a leading edge 46 which is oriented towards or into the flow of hot gas 34, and a trailing edge 48 which is downstream from the leading edge 46. The leading edge 46 and the trailing edge extend in span between the root 42 and tip portion 44.

As shown in FIG. 3, the airfoil 40 includes a pair of opposing side walls 50. In particular embodiments, the airfoil 40 includes a first or pressure side wall 52 and an opposing second or suction side wall 54. The pressure side wall 52 and suction side wall 54 extend in chord between the leading edge 46 and the trailing edge 48 of the airfoil 40. The pressure side wall 52 and suction side wall 54 extend radially in span between the root 42 and tip portion 44. The pressure side wall 52 generally comprises an aerodynamic, substantially concave surface of the airfoil 40. In contrast, the suction side wall 54 may generally define an aerodynamic, substantially convex surface of the airfoil 40.

In particular embodiments, as shown in FIGS. 2 and 3 a mid-span shroud assembly 100 is coupled to the airfoil 40. The mid-span shroud assembly 100 may be located anywhere along the airfoil 40 span and is not limited to a physical mid-point of the span of the airfoil 40 unless otherwise provided in the claims and/or the specification. The mid-span shroud assembly 100 creates a contact between adjacent turbine blades 28 for a full 360 degrees around the rotor shaft 24 and/or rotor disk 26 at a desired percent of span and/or a desired percent of chord of a given turbine blade 28. This contact alters the vibratory characteristics (natural frequencies and mode shapes) of the airfoil 40.

As shown in FIG. 3, the mid-span shroud assembly 100 generally includes a pair of shroud bodies 102. In one embodiment, a first or pressure side shroud body 104 is associated with the pressure side wall 52 of the airfoil 40 and a second or suction side shroud body 106 is associated with the suction side wall 54 of the airfoil 40.

As shown in FIG. 3, the pressure side shroud body 104 extends or projects outwardly from the pressure side wall 52. The pressure side shroud body 104 extends at least partially between the leading and trailing edges 46, 48 along the pressure side wall 52. In one embodiment, the pressure side shroud body 104 extends along the pressure side wall 52 intermediate to the leading and trailing edges 46, 48. In particular embodiments, the pressure side shroud body 104 includes an inner or mating portion or surface 108 which is formed to substantially contour to a portion of the pressure side wall 52. The inner mating portion 108 that contacts with the airfoil 40 may have a crowned shape or distinct raised areas in order to provide determinate contact between the airfoil 40 and the inner mating portion 108. This may be preferable when the airfoil 40 is cast and thus not 100% repeatable from part to part.

As shown in FIG. 3, the suction side shroud body 106 extends or projects outwardly from the suction side wall 54. The suction side shroud body 106 extends along the suction side wall 54 at least partially between the leading and trailing edges 46, 48. In one embodiment, the suction side shroud body 106 extends substantially intermediate to the leading and trailing edges 46, 48 along the suction side wall 54.

Figure 4:
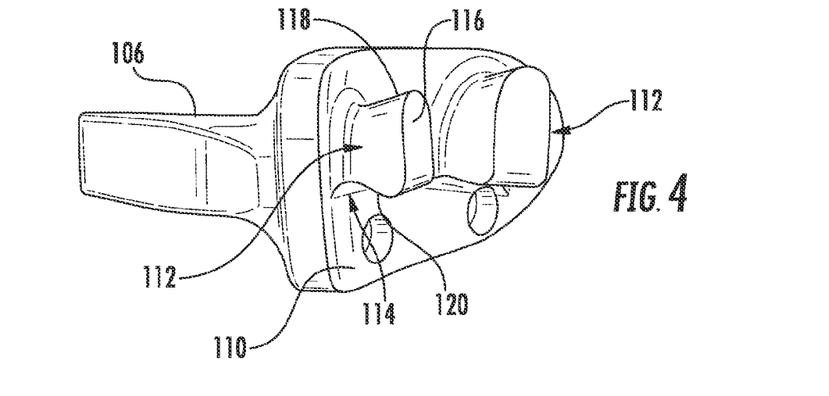
FIG. 4 is a perspective view of an exemplary suction side shroud body according to at least one embodiment of the present invention.

FIG. 4 provides a perspective view of the suction side shroud body 106 according to at least one embodiment of the present invention. In one embodiment, as shown in FIG. 4, the suction side shroud body 106 includes an inner or mating portion or surface 110 which is formed to substantially contour to a portion of the suction side wall 54 (FIG. 3). The inner mating surface or portion 110 that contacts the airfoil 40 may have a crowned shape or distinct raised areas in order to provide determinate contact between the airfoil 40 and the inner mating portion 110. Again, this may be preferable when the airfoil 40 is cast and thus not 100% repeatable from part to part.

Figure 6:
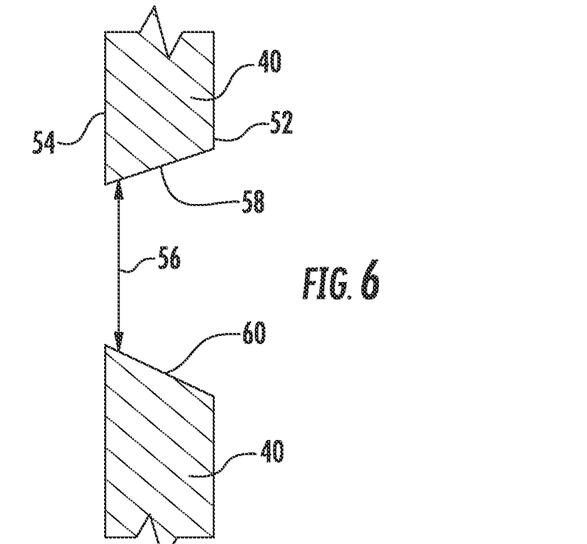
FIG. 6 is a cross sectional front view of a portion of an exemplary airfoil according to at least one embodiment of the present invention.
Figure 7:
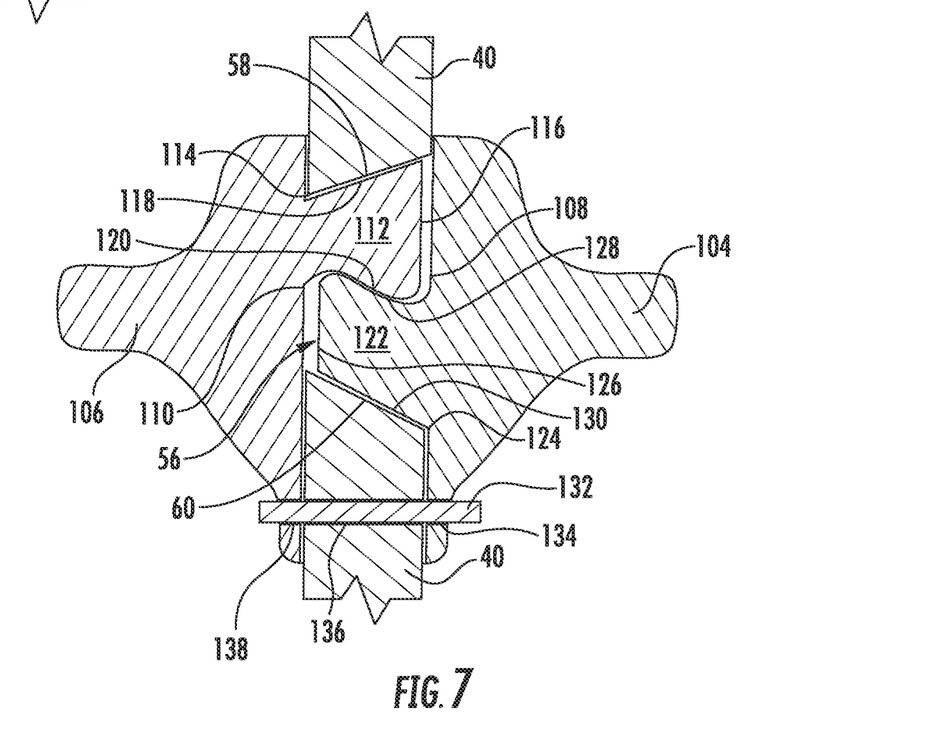
FIG. 7 is a cross sectional front view of a portion of an exemplary airfoil including an exemplary pressure side shroud body and an exemplary suction side shroud body according to at least one embodiment of the present invention.

FIG. 6 provides a cross sectional front view of a portion of the airfoil 40 with the pressure side shroud body 104 and the suction side shroud body 106 removed for clarity, according to at least one embodiment of the present invention. FIG. 7 provides a cross sectional front view of a portion of the airfoil 40 including the pressure side shroud body 104 and the suction side shroud body 106 installed or mounted within and/or to the airfoil 40, according to at least one embodiment of the present invention.

As shown in FIG. 6, the airfoil 40 further defines a spar opening 56 which extends through the pressure and suction side walls 52, 54 of the airfoil 40 for receiving the pressure side and suction side shrouds 104, 106 therein. The spar opening 56 includes an upper engagement surface 58 and a lower engagement surface 60. In one embodiment, the upper and lower engagement surfaces 58, 60 diverge in opposing radial directions from the suction side wall 54 towards the pressure side wall 52 so as to form a dovetail shaped opening.

In one embodiment, as shown in FIGS. 4 and 7, the suction side shroud body 106 defines at least one first spar or lug 112. The first spar 112 is disposed or defined along the inner mating surface 110 of the suction side shroud body 106. The first spar 112 extends or projects outward from the inner mating surface 110. As shown in FIG. 7, the first spar 112 is formed to extend or project at least partially through the spar opening 56 defined within the airfoil 40. The first spar 112 includes a root portion 114 and a tip portion 116. The root portion 114 is generally defined at an intersection with the inner mating surface 110. The tip portion 116 is distal to the root portion 114.

As shown in FIGS. 4 and 7, the first spar 112 further includes and/or defines an upper face or surface 118 and a lower face or surface 120. In one embodiment, as shown in FIGS. 4 and 7, the upper and lower faces 118, 120 converge in radially opposite directions from the tip portion 116 towards the root portion 114 of the first spar 112. In other words, the tip portion 116 is wider radially than the root portion 118 of the first spar 112. In one embodiment, the upper and lower faces 118, 120 form a wedge or dovetail. In one embodiment, as shown in FIG. 7, the upper face 114 of the first spar 112 is formed so as to be parallel with the upper engagement surface 58 of the spar opening 56. In other embodiments, as shown in FIG. 4, the suction side shroud body 106 may define a plurality of first spars 112 which are disposed or defined along the inner surface 110.

Figure 5:
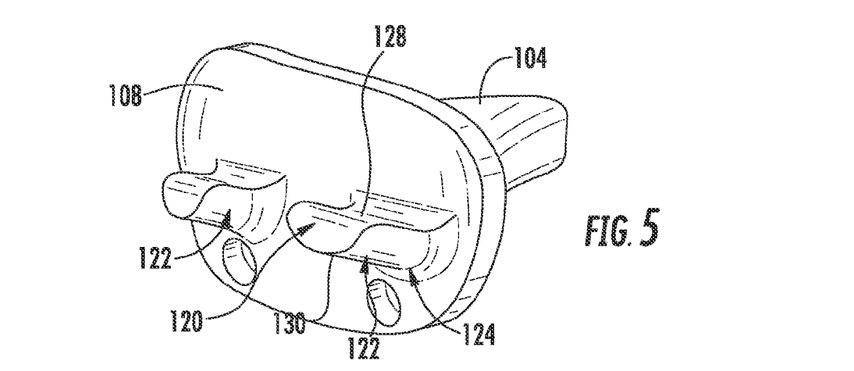
FIG. 5 is a perspective view of an exemplary pressure side shroud body according to at least one embodiment of the present invention.

FIG. 5 is a perspective view of an exemplary pressure side shroud body 104 according to at least one embodiment of the present invention. In one embodiment, as shown in FIGS. 5 and 7, the pressure side shroud body 104 defines at least one second spar or lug 122. The second spar 122 is disposed or defined along the inner mating surface 108 of the pressure side shroud body 104. The second spar 122 extends or projects outward from the inner mating surface 108. As shown in FIG. 7, the second spar 122 is formed to extend or project at least partially through the spar opening 56 defined within the airfoil 40. The second spar 122 includes a root portion 124 and a tip portion 126. The root portion 124 is generally defined at an intersection with the inner mating surface 108. The tip portion 126 is distal to the root portion 124.

As shown in FIGS. 5 and 7, the second spar 122 further includes and/or defines an upper face or surface 128 and a lower face or surface 130. In one embodiment, as shown in FIGS. 4 and 7 the upper face 128 of the second spar 122 is formed to be substantially parallel with the lower face 120 of the first spar 112 of the suction side shroud body 106. In one embodiment, the lower face 130 of the second spar 122 of the pressure side shroud body 104 is formed to be substantially parallel with the lower engagement surface 60 of the spar opening 56. For example, the lower face 130 of the second spar 122 diverges radially from the tip portion 126 towards the root portion 124.

In particular embodiments, as shown in FIG. 7, the mid-span shroud assembly includes a fastener 132 which extends through fastener holes 134, 136, 138 defined within the pressure side shroud body 104, the airfoil 40 and the suction side shroud body 106 respectively. The fastener 132 provides a clamping force to hold the pressure side shroud body 104 against the pressure side wall 52 and the suction side shroud body 106 against the suction side wall 54 of the airfoil.

The fastener 132 may include any suitable fastener such as a bolt, pin, rivet or the like. The fastener 132 may include a head portion which is disposed at one end of the fastener 132. A second end of the fastener 132 may be formed to flare outward to lock the fastener 132 in place. In addition or in the alternative, the second end of the fastener may be threaded to receive a nut or threaded fastener. In addition or in the alternative, the fastener 132 may be welded or held in place by other suitable means such as welding, a nut or the like.

In one embodiment, during installation, the first spar 112 of suction side shroud body 106 is inserted into the spar opening 56 and held in place along the suction side wall 54 such that the upper face 118 of the first spar 112 is engaged or nearly engaged with the upper engagement surface 58 of the spar opening 56. The second spar 122 of the pressure side shroud body 104 is inserted between the lower face 120 of the suction side shroud body first spar 112 and the lower engagement surface 60 of the spar opening 56.

When released, the lower face 130 of the second spar 122 of the suction side shroud body 106 may rest on or adjacent to the lower engagement surface 60 of the spar opening 56. The lower face 120 of the first spar 112 of the suction side shroud body 106 rests on the upper face 128 of the second spar 122 of the pressure side shroud body 104. The upper face 118 of the spar of the suction side shroud body engages with the upper engagement surface 58 of the spar opening 56. As a result, the suction side and pressure side shroud bodies 106, 104 are locked to each other and to the airfoil, particularly when subjected to centrifugal loading such as when the turbine blades 28 are rotated with the rotor shaft 22. The centrifugal loading results in a normal load to the pressure side and suction side walls 52, 54 of the airfoil 40. The first and second spars 112, 122 also may transfer the centrifugal loads created by the pressure side and suction side shroud bodies 104, 106 to the airfoil 40.

Figure 8:
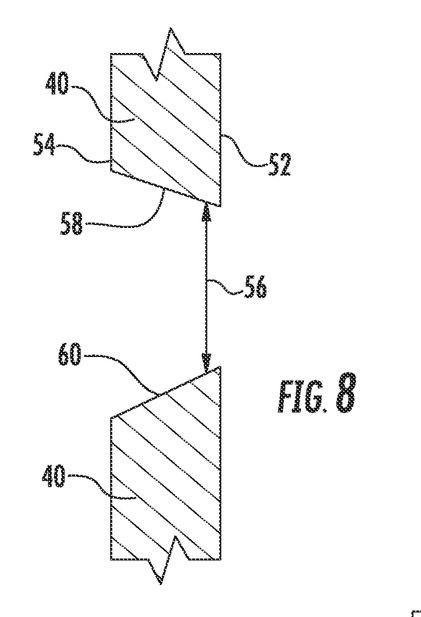
FIG. 8 is a cross sectional front view of a portion of an exemplary airfoil according to at least one embodiment of the present invention.
Figure 9:
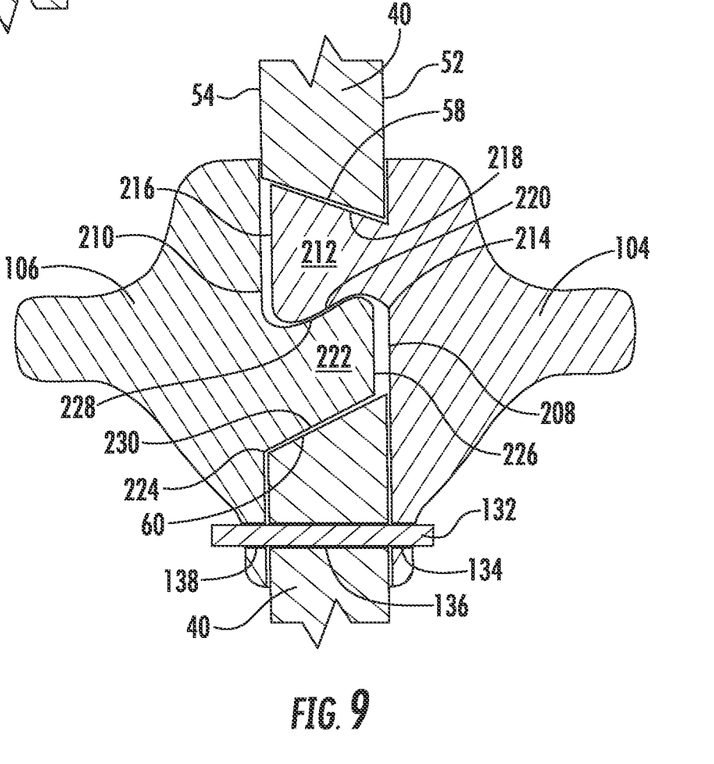
FIG. 9 is a cross sectional front view of a portion of an exemplary airfoil including an exemplary pressure side shroud body and an exemplary suction side shroud body according to at least one embodiment of the present invention.

FIG. 8 provides a cross sectional front view of a portion of the airfoil 40 with the pressure side shroud body 104 and the suction side shroud body 106 removed for clarity, according to at least one embodiment of the present invention. FIG. 9 provides a cross sectional front view of a portion of the airfoil 40 including the pressure side shroud body 104 and the suction side shroud body 106 installed or mounted to the airfoil 40, according to at least one embodiment of the present invention.

In another embodiment, as shown in FIGS. 8 and 9, the upper and lower engagement surfaces 58, 60 of the spar opening 56 diverge in opposing radial directions from the pressure side wall 52 towards the suction side wall 54 so as to form a dovetail shaped opening. As shown in FIG. 9, the pressure side shroud body 106 defines at least one first spar or lug 212. The first spar 212 is disposed or defined along the inner mating surface 108 of the pressure side shroud body 104. The first spar 212 extends or projects outward from the inner mating surface 108. As shown in FIG. 9, the first spar 212 is formed to extend or project at least partially through the spar opening 56 defined within the airfoil 40. The first spar 212 includes a root portion 214 and a tip portion 216. The root portion 214 is generally defined at an intersection with the inner mating surface 108. The tip portion 216 is distal to the root portion 214.

As shown in FIG. 9, the first spar 212 further includes and/or defines an upper face or surface 218 and a lower face or surface 220. In one embodiment, as shown in FIG. 9, the upper and lower faces 218, 220 converge in radially opposite directions from the tip portion 216 towards the root portion 214 of the first spar 212. In other words, the tip portion 216 is wider radially than the root portion 214 of the first spar 212. In one embodiment, the upper and lower faces 218, 220 form a wedge or dovetail. In one embodiment, as shown in FIG. 9, the upper face 214 of the first spar 212 is formed so as to be parallel with the upper engagement surface 58 of the spar opening 56 particularly when inserted into the spar opening 56. In other embodiments, the pressure side shroud body 104 may define a plurality of first spars 212 which are disposed or defined along the inner surface 208.

As shown in FIG. 9, the suction side shroud body 106 defines at least one second spar or lug 222. The second spar 222 is disposed or defined along the inner mating surface 210 of the suction side shroud body 106. The second spar 222 extends or projects outward from the inner mating surface 210. As shown in FIG. 9, the second spar 222 is formed to extend or project at least partially through the spar opening 56 defined within the airfoil 40. The second spar 222 includes a root portion 224 and a tip portion 226. The root portion 224 is generally defined at an intersection with the inner mating surface 210. The tip portion 226 is distal to the root portion 224.

As shown in FIG. 9, the second spar 222 further includes and/or defines an upper face or surface 228 and a lower face or surface 230. In one embodiment, as shown in FIG. 9 the upper face 228 of the second spar 222 is formed to be substantially parallel with the lower face 220 of the first spar 212 of the pressure side shroud body 104, particularly when inserted into the spar opening 56. In one embodiment, the lower face 230 of the second spar 222 of the suction side shroud body 106 is formed to be substantially parallel with the lower engagement surface 60 of the spar opening 56. For example, the lower face 230 of the second spar 222 diverges radially from the tip portion 226 towards the root portion 224.

As shown in FIG. 9, the fastener 132 extends through fastener holes 134, 136, 138 defined within the pressure side shroud body 104, the airfoil 40 and the suction side shroud body 106 respectively. The fastener 132 provides a clamping force to hold the pressure side shroud body 104 against the pressure side wall 52 and the suction side shroud body 106 against the suction side wall 54 of the airfoil.

In this embodiment, the first spar 212 of pressure side shroud body 104 is inserted into the spar opening 56 and held in place and/or push radially upward along the pressure side wall 52 such that the upper face 218 of the first spar 212 is engaged or nearly engaged with the upper engagement surface 58 of the spar opening 56. The second spar 222 of the pressure side shroud body 104 is inserted between the lower face 220 of the pressure side shroud body first spar 212 and the lower engagement surface 60 of the spar opening 56.

When released, the lower face 230 of the second spar 222 of the suction side shroud body 106 may rest on or adjacent to the lower engagement surface 60 of the spar opening 56. The lower face 220 of the first spar 212 of the pressure side shroud body 104 rests on the upper face 228 of the second spar 222 of the suction side shroud body 106. The upper face 218 of the spar of the pressure side shroud body 104 engages with the upper engagement surface 58 of the spar opening 56. As a result, the pressure side and suction side shroud bodies 104, 106 are locked to each other and to the airfoil 40, particularly when subjected to centrifugal loading such as when the turbine blades 28 are rotated with the rotor shaft 22. The centrifugal loading results in a normal load to the pressure side and suction side walls 52, 54 of the airfoil 40. The spars 212, 222 also may transfer the centrifugal loads created by the pressure side and suction side shroud bodies 104, 106 to the airfoil 40.

As described and illustrated herein, the present invention provides various technical benefits over existing turbine blade mid-span shroud technologies. For example, this mid-span shroud assembly 100 creates a contact between adjacent turbine blades 28 for a full 360 degrees around the turbine disk 26 at a desired percent span/percent chord of the given turbine blade 28. This contact alters the natural frequencies and mode shapes of the airfoil 40. The wedge or dovetail shaped spars 112, 212 lock the pressure side and suction side shroud bodies 104, 106 to each other and to the airfoil 40 under centrifugal loading. The centrifugal loading results in a normal load to the pressure side and suction side walls 52, 54 of the airfoil 40. The normal load may be adjusted by adjusting angles of the various surfaces or faces of the spars and/or the upper and/or lower engagement surfaces of the spar opening 56.

In addition to providing a clamping force to the pressure side and suction side shroud bodies 104, 106 during rotation of the turbine blade 28, the spars 112, 211 and/or 122, 222 may transfer the centrifugal loads of the pressure side and suction side shroud bodies 104, 106 to the airfoil 40. In addition or in the alternative, as the centrifugal load increases the normal load increase with it, thereby reducing bending in the fastener 132. In addition or in the alternative, the mid-span shroud assembly as presented herein may be incorporated into new OEM parts and/or may be adapted to fit exiting turbine blade designs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A mid-span shroud assembly for a turbine blade airfoil, the mid-span shroud assembly comprising:
   a suction side shroud body defining a first spar formed to extend at least partially through a spar opening defined within the airfoil, the first spar having a root portion, a tip portion, an upper face and a lower face, wherein the upper and lower faces converge from the tip portion towards the root portion; and
   a pressure side shroud body defining a second spar formed to extend at least partially through the spar opening, the second spar having a root portion, a tip portion, an upper face and a lower face, wherein the upper face of the second spar is formed to be substantially parallel with the lower face of the first spar.

2. The mid-span shroud assembly as in claim 1, wherein the pressure side shroud body and the suction side shroud body define fastener holes, the mid-span shroud assembly further comprising a fastener formed to extend through the fasteners holes, wherein the fastener provides a clamping force to hold the pressure side shroud body and the suction side shroud body against pressure and suction side walls of the airfoil.

3. The mid-span shroud assembly as in claim 1, wherein the upper face of the first spar is formed to be parallel with an upper engagement surface of the spar opening.

4. The mid-span shroud assembly as in claim 1, wherein the lower face of the second spar is formed to be parallel with a lower engagement surface of the spar opening.

5. The mid-span shroud assembly as in claim 1, wherein the lower face of the second spar diverges from the tip portion towards the root portion.

6. The mid-span shroud assembly as in claim 1, wherein the pressure side shroud body includes a mating side portion formed to contour to the pressure side wall of the airfoil and the suction side shroud body includes a mating side portion formed to contour to the suction side wall.

7. The mid-span shroud assembly as in claim 1, wherein the first spar is substantially wedge or dovetail shaped.

8. The mid-span shroud assembly as in claim 1, wherein the spar opening is dovetail shaped.

9. A turbine blade, comprising:
   an airfoil having a pressure side wall, a suction side wall opposing the pressure side wall and a spar opening, the spar opening extending through the pressure and suction side walls, the spar opening defining an upper engagement surface and a lower engagement surface; and a mid-span shroud assembly, the mid-span shroud assembly comprising:
 a pressure side shroud body defining a first spar formed to extend at least partially through the spar opening defined within the airfoil, the first spar having a root portion, a tip portion, an upper face and a lower face, wherein the upper and lower faces converge from the tip portion towards the root portion; and
 a suction side shroud body defining a second spar formed to extend at least partially through the spar opening, the second spar having a root portion, a tip portion, an upper face and a lower face, wherein the upper face of the second spar is formed to be substantially parallel with the lower face of the first spar.

10. The turbine blade as in claim 9, wherein the suction side shroud body and the pressure side shroud body define fastener holes, the mid-span shroud assembly further comprising a fastener formed to extend through the fasteners holes and the airfoil, wherein the fastener provides a clamping force to hold the pressure side shroud body and the suction side shroud body against the pressure and suction side walls.

11. The turbine blade as in claim 9, wherein the upper face of the first spar is formed to be parallel with the upper engagement surface of the spar opening.

12. The turbine blade as in claim 9, wherein the lower face of the second spar is formed to be parallel with the lower engagement surface of the spar opening.

13. The turbine blade as in claim 9, wherein the lower face of the second spar diverges from the tip portion towards the root portion.

14. The turbine blade as in claim 9, wherein the pressure side shroud body includes a mating side portion formed to contour to the pressure side wall of the airfoil and the suction side shroud body includes a mating side portion formed to contour to the suction side wall.

15. The turbine blade as in claim 9, wherein the first spar is substantially wedge or dovetail shaped.

16. The turbine blade as in claim 9, wherein the upper and lower engagement surfaces diverge in radially opposite direction from the pressure side wall towards the suction side wall.

17. A gas turbine, comprising:
 a compressor section;
 a combustion section downstream from the compressor section; and
 a turbine section downstream from the combustion section, the turbine section including a plurality of turbine blades coupled to a rotor shaft, each turbine blade including an airfoil having a pressure side wall, a suction side wall and a spar opening, each turbine blade including a mid-span shroud assembly coupled to the airfoil, the mid-span shroud assembly comprising:
  a suction side shroud body defining a first spar formed to extend at least partially through the spar opening, the first spar having a root portion, a tip portion, an upper face and a lower face, wherein the upper and lower faces converge from the tip portion towards the root portion; and
  a pressure side shroud body defining a second spar formed to extend at least partially through the spar opening, the second spar having a root portion, a tip portion, an upper face and a lower face, wherein the upper face of the second spar is formed to be substantially parallel with the lower face of the first spar.

18. The gas turbine as in claim 17, wherein the pressure side shroud body and the suction side shroud body define fastener holes, the mid-span shroud assembly further comprising a fastener formed to extend through the fasteners holes and the airfoil, wherein the fastener provides a clamping force to hold the pressure side shroud body and the suction side shroud body against the pressure and suction side walls of the airfoil.

19. The gas turbine as in claim 17, wherein the upper face of the first spar is formed to be parallel with an upper engagement surface of the spar opening.

20. The gas turbine as in claim 17, wherein the lower face of the second spar is formed to be parallel with a lower engagement surface of the spar opening.

* * * * *